United States Patent
Salibrici et al.

Patent Number: 5,768,355
Date of Patent: Jun. 16, 1998

[54] THREE-WAY CALL DETECTION SYSTEM

[75] Inventors: William Salibrici, Jobstown, N.J.; Kishan Shenoi, Saratoga, Calif.; Thomas R. Spadaro, Burlington; Michael S. Jaeger, Marlton, both of N.J.

[73] Assignee: Science Dynamics Corporation, Cherry Hill, N.J.

[21] Appl. No.: 649,071

[22] Filed: May 16, 1996

[51] Int. Cl.$^6$ .................................... H04M 1/66
[52] U.S. Cl. ..................... 379/189; 379/377; 379/393
[58] Field of Search ..................... 379/24, 34, 35, 379/93.01, 188, 189, 199, 201, 202, 215, 377, 386, 393, 410, 421, 424, 251, 204, 205, 206; 370/260, 261, 262, 263, 270

[56] References Cited

U.S. PATENT DOCUMENTS

| | | | |
|---|---|---|---|
| 3,626,107 | 12/1971 | Armstrong et al. | 379/201 |
| 3,660,610 | 5/1972 | Hestad et al. | 379/203 |
| 4,387,274 | 6/1983 | Stein et al. | 379/393 |
| 4,477,698 | 10/1984 | Szlam et al. | 379/377 |
| 4,552,996 | 11/1985 | De Bergh | 379/24 |
| 4,802,207 | 1/1989 | Uchida et al. | 379/377 |
| 4,803,718 | 2/1989 | Neil et al. | 379/393 |
| 5,216,702 | 6/1993 | Ramsden | 379/24 |
| 5,283,825 | 2/1994 | Druckman et al. | 379/167 |
| 5,287,401 | 2/1994 | Lin | 379/215 |
| 5,319,702 | 6/1994 | Kitchin et al. | 379/189 |
| 5,394,465 | 2/1995 | Jo | 379/377 |
| 5,428,662 | 6/1995 | Hamilton | 379/377 |
| 5,450,485 | 9/1995 | Hamilton | 379/377 |
| 5,535,261 | 7/1996 | Brown et al. | 379/35 |
| 5,539,812 | 7/1996 | Kitchin et al. | 379/189 |
| 5,619,561 | 4/1997 | Reese | 379/202 |

OTHER PUBLICATIONS

Anderson, Susan, "Three-Way Call Detect . . . Close Enough to Perfect?", Correctional Communications Quarterly, pp. 16–20, Oct. 1993.

Primary Examiner—Krista Zele
Assistant Examiner—Scott Wolinsky
Attorney, Agent, or Firm—Woodcock Washburn Kurtz Mackiewicz & Norris LLP

[57] ABSTRACT

Disclosed is a three-way call detection system that uses digital signal processing to identify a third party connection. The disclosed invention operates by establishing a baseline ambient, or background, noise level, and detecting when the signal noise level drops below the ambient noise level. When the current signal noise level drops below the ambient noise level, the system assumes that a three-way conference call has been attempted by the called party.

7 Claims, 2 Drawing Sheets

THREE-WAY CALL DETECTION SYSTEM

FIELD OF THE INVENTION

The present invention relates to systems for detecting the initiation of a three-way conference call. More particularly, the present invention relates to conference call detection systems which detect that a central office (CO) switching system, which connects remote and local telephones, has placed a local phone on hold for a brief period.

BACKGROUND OF THE INVENTION

Three-way conference calls are placed when a remote party (i.e., the person who has been called) initiates the generation of a hook-flash signal while a call is in progress. In response to the hook-flash signal, the central office places the local party on hold while the remote party dials a third party. When the third party call is connected, the remote party initiates a second hook-flash, which tells the central office to reestablish the connection with the local party, and thus a three-way conference call is established.

Prior art technology for detecting, at the calling or local station, an attempt by the called party to set up a three-way call can be found in U.S. Pat. No. 5,319,702, Jun. 7, 1994, "Method And Apparatus For Detecting And Responding To Hook Flash Events Occurring On A Remote Telephone" (Kitchin). Kitchin discloses a system for performing a number of telephone related functions, one of which is three-way call detection. Kitchin's three-way call detection method works by, first, filtering out (with a lowpass filter) frequency components above 300 Hz. An energy detector monitors the filtered signals for an electrical energy pulse which exceeds a minimum threshold. If a specific energy pulse exceeds the threshold value, a "window analyzer" is employed to determine whether the called party has in fact attempted to make a three-way call. One perceived shortcoming of the Kitchin system is its ineffectiveness when used with digital switching systems. This perceived shortcoming is a consequence of the fact that the hook flash signal typically will not pass through a central office digital switch for detection at the local telephone.

SUMMARY OF THE INVENTION

The present invention provides an improved three-way call detection system designed to work in a digital switching environment. The invention operates by establishing a baseline ambient, or background, noise level, and detecting when the signal noise level drops below the ambient noise level. When the current signal noise level drops below the ambient noise level, the system assumes that a three-way conference call has been attempted by the called party.

In one presently preferred embodiment of the invention, a bandpass filter is employed to pass frequency components in the range of about 300 to 3,400 Hz. (This is in contrast to the Kitchin system, which only considers frequency components below 300 Hz.) The bandpass-filtered signal is passed through an absolute value circuit, and the resulting absolute value signal is compared with a pre-established threshold (i.e., the previously determined ambient noise level). The system assumes that a three-way call has been attempted when the absolute value signal, which is indicative of the signal noise level, falls below the threshold ambient noise level and stays below this level for a prescribed period.

Other features of the present invention are disclosed below.

DETAILED DESCRIPTION OF PREFERRED EMBODIMENTS

Figure 1:
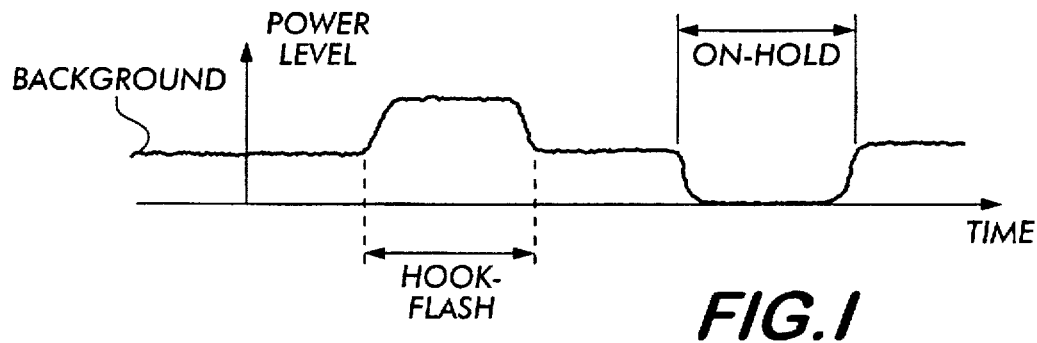
FIG. 1 is a diagram of power level on a telephone line, as a function of time, illustrating that when a local phone is placed on hold, as occurs when a three-way call is initiated by a remote party, the power level falls below the background or ambient power level.

FIG. 1 depicts the power level on a telephone line as a function of time during the initiation of a three-way call. As shown, when a remote party initiates a hook flash signal, the short-term power level increases significantly. When the local phone is placed on hold by the central office in response to the hook-flash signal, the power level falls well below the nominal background noise level. The present invention assumes that an attempt has been made to create a three-way call when the received power level at the local phone falls below the ambient noise level.

Figure 2:
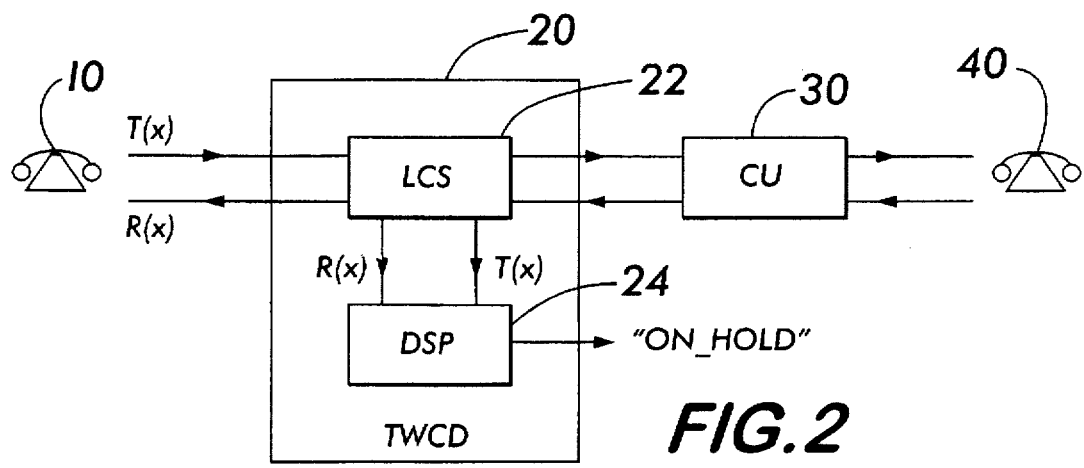
FIG. 2 is a block diagram depicting one presently preferred embodiment of a three-way call detection system in accordance with the present invention.

FIG. 2 is a block diagram of a three-way call detection system in accordance with the present invention. As shown, a three-way call detection (TWCD) circuit 20 is inserted between the local phone 10 and the central office (CO) 30. The three-way call detection circuit 20 primarily comprises a loop control supervisor (LCS) 22 and a digital signal processor (DSP) 24. The detection circuit 20 is inserted at a four-wire point in the system and monitors the signal that is received from the remote connection 40.

As shown in FIG. 2, the signal received from the central office 30 through the LCS 22 is designated "R(x)". The signal transmitted from the local phone 10 is designated "T(x)". It is assumed that R(x) is available in digital format, most likely in a u-law encoded, 8 kHz sampled format.

As shown, the LCS 22 routes R(x) to the digital signal processor (DSP) 24. In general, the DSP 24 compares R(x) to a baseline ambient "noise" power level. When R(x) falls below the baseline power level, the DSP generates an ON-HOLD signal indicating that a three-way call has been attempted.

Figure 3:
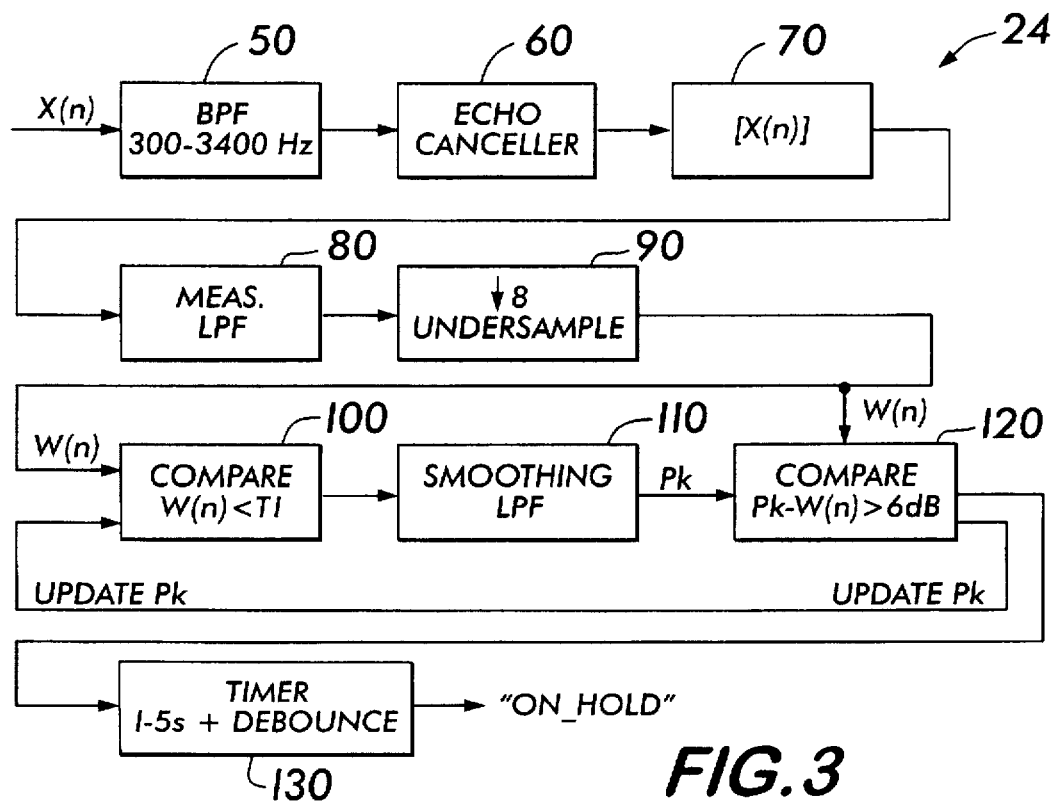
FIG. 3 is a block diagram of the digital signal processor employed by the three-way call detection system of FIG. 2.

FIG. 3 is a block diagram of the DSP 24 employed by the three-way call detection circuit 20 of FIG. 2. As shown in FIG. 3, the received signal, designated "X(n)", is filtered by the DSP 24 using a bandpass filter 50. The bandpass filter 50 could take many forms including: deleting frequencies at 60/50 Hz or below 300 Hz; deleting components above 3.4 kHz; restricting the frequency band to 0.3–0.7 kHz; or restricting the frequency band to 1.0–3.4 kHz. In the presently preferred embodiment, a Codec A/D converter is used to implement a bandpass filter 50 of 0.3–3.4 kHz.

An echo canceller, depicted by block 60 in FIG. 3, is used to suppress echo signals from the local phone 10 (transmit) side. Impedance mismatches between the four-wire monitor point and the three-way call detection circuit 20 can result in local echo signals. An echo signal could potentially mask any silence in the received signal. Therefore, an echo canceller 60 is utilized to suppress the echo level so as to allow the signal processor 24 to reliably detect silence.

As explained above, the present invention operates by detecting deviations from the baseline ambient noise power level. It is therefore necessary that the system establish a baseline power level. The normal method for estimating average power is to find the average of the square of the received signal. However, squaring operations tend to diminish accuracy, especially in a fixed point implementation such as the present embodiment.

An alternative method of establishing the power level, which permits a single precision fixed point implementation, employs an absolute value operation instead of squaring. As represented by block 70 in FIG. 3, preferred embodiments of the present invention utilize this absolute value method. The absolute value operation 70 gives a result that is representative of the "strength" of the signal, although it is not a representation of the "power" per se. Algorithm simulations completed by the inventors show that the absolute value function 70 gives a signal strength that is higher than the power level given by squaring.

As shown, the power signal is transmitted to a lowpass filter (LPF) 80 in order to measure the signal. The measurement lowpass filter 80 is essentially a leaky integrator (i.e., first order filter) with a digital transfer function of the form $$H(z) = G \times \frac{(1+z^{-1})}{(1-az^{-1})} \qquad \text{EQ (1)}$$

where G, for unity gain at DC, is nominally given by $$G = \frac{(1-a)}{2} \qquad \text{EQ (2)}$$

and for stability, $0 < a < 1$.

The LPF 80 may be implemented as a second order digital filter. A transposed, direct form II, IIR structure was chosen for several reasons. It requires a minimum number of multiplications and a minimum amount of memory. Moreover, the transposed IIR structure simplifies the noise model used by filter design software to optimize filter coefficients. Additionally, it is easy to construct higher order filters by cascading second order sections.

The digital transfer function for the second order section is given by $$H(z) = \frac{B_2 + B_1 z^{-1} + B_0 z^{-2}}{1 + C_1 z^{-1} + C_0 z^{-2}} \qquad \text{EQ (3)}$$

where z raised to the (−1) represents one unit delay, and z raised to the (−2) represents two unit delays.

The digital transfer function evaluated on the unit circle (i.e., for $|z|=1$) is the frequency response of the system. The relationship between analog and digital frequency is given by $$W_d = \frac{2 \times \Pi}{F_s} \times F_a \qquad \text{EQ (4)}$$

where Wd is digital frequency in radians, Fa is analog frequency in Hz, and Fs is the sample rate in Hz.

A first order filter can be implemented by setting the appropriate second order section coefficients to zero. If $a=0.9$ and $G=0.05$, the first order measurement LPF 80 can be implemented by a second order section when $B_2=1.0$, $B_1=1.0$, $B_0=0$, $C_1=-0.9$, and $C_0=0$.

The linear constant coefficient difference equations for the measurement LPF 80 are:

$$Y(n)=GB_2X(n)+K(n-1) \qquad \text{EQ(5)}$$

$$K(n)=GB_1X(n)-C_1Y(n) \qquad \text{EQ(6)}$$

The recursive relationship for W(n), which is the measurement LPF 80 output, is derived from the difference equations and is given by $$W(n)=G(U(n)+U(n-1))+aW(n-1) \qquad \text{EQ(7)}$$

where U(n) is the absolute value output. The impulse response of this filter dies out as $a^n$.

For the value of a given above, the impulse response will be below 1% of its initial value in about 44 samples (just over 5 milliseconds at 8 kHz sample rate). Thus, W(n) represents the short term power over the most recent 44 samples or equivalently the most recent 5 millisecond time interval. The samples of W(n) are available at 8 kHz.

Due to the characteristics of the measurement LPF 80, W(n) can be undersampled prior to further processing, as depicted by block 90 in FIG. 3. In one presently preferred embodiment, an undersampling factor of eight is used. The undersampled output is denoted W(m) and represents every eighth sample of W(n).

In order to identify silence, a comparison, identified by block 100 in FIG. 3, is made between the undersampled output and a threshold level. If W(m) is above a predetermined threshold, T1, the segment of the signal over the recent past (about 5 ms) most likely represents speech. If W(m) is below this threshold, the segment of signal is likely background noise (or the trailing edge of a speech-like utterance). In the presently preferred embodiment, T1 is approximately −36 dBm0.

In order to establish the ambient (background) noise level, a smoothing lowpass filter (LPF) 110 is applied to those samples of W(m) that are below the threshold T1. Therefore, if W(m)<T1, the smoothed power level is updated according to the equation $$P_{k+1}=bP_k+(1-b) W(m) \qquad \text{EQ(8)}$$

$$P_k=P_{k+1} \qquad \text{EQ(9)}$$

The smoothing LPF 110 has an equivalent first order digital transfer function given by $$H(z) = \frac{1-b}{1-bz^{-1}} \qquad \text{EQ (10)}$$

This transfer function is used because only the samples below the threshold are applied to the filter. The smoothing LPF 110 is not a true filter in the strict sense of the word. If b is equal to 0.95 and the gain factor is 0.05, the first order smoothing LPF 110 can be implemented by a second order section where $B_2=1.0$, $B_1=0$, $B_0=0$, $C_132 -0.95$, and $C_0=0$.

Figure 4:
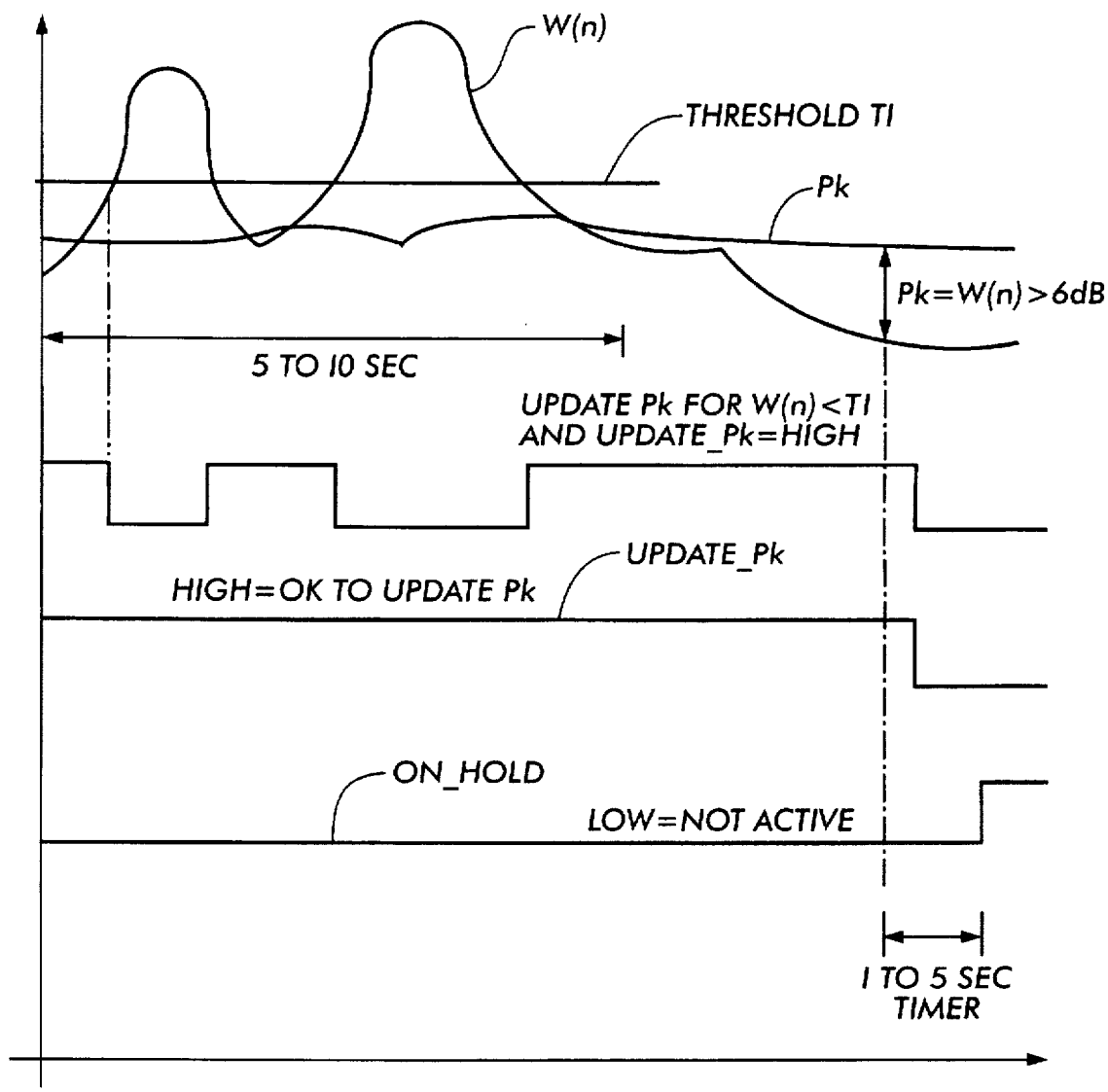
FIG. 4 is a detailed timing diagram illustrating the operation of the three-way call detection system of FIG. 2.

As shown in FIG. 4, after approximately 5 to 10 seconds into a call, Pk, the smoothed version of the background noise short term power, will stabilize (within ±3 dB). If W(m), the short term power, drops more than 6 dB below this level (as determined in block 120) and remains there for some period, the local telephone has been placed on hold. If this 6 dB difference persists for longer than two consecutive samples of W(m), Pk is not updated according to equations 9 and 10. The stable value for Pk will be in the range of approximately −44 dBm0 (noisy circuit) to approx −65 dBm0 (clean circuit).

Some short term flicker can be expected around the detection threshold. Therefore, the invention provides a debouncing operation 130 to accommodate flicker. In the presently preferred embodiment, a 1 to 5 second timer has been implemented to allow flicker disturbances to settle.

Therefore, the present invention employs digital signal processing techniques to detect a park silence condition. This solution requires that the central office insert silence in the direction toward the local calling party when the local party is placed on hold. While the local party is holding, the received signal level falls below the normal ambient silence (absence of speech). The present invention operates to establish a baseline ambient noise power level (essentially the power level when the remote talker is not talking). With a baseline ambient noise power level identified, the system identifies a three-way call by detecting that the signal level has dropped below the established ambient level.

The present invention is not limited to the presently preferred embodiments of the methods and apparatus described above. For example, the coefficient and threshold values may be adjusted as appropriate for a given implementation, as will be recognized by those skilled in the art. Accordingly, except where they are expressly so limited, the scope of protection of the following claims is not limited to the details specified above.

We claim:

1. A method for detecting the initiation, by a called party, of a three-way call, comprising the steps of:
   (a) determining a baseline ambient noise level on a telephone line connecting a calling phone to a central office;
   (b) monitoring a current ambient noise level on said telephone line, and generating a signal (ON_HOLD) indicative of a three-way call when said current ambient noise level falls below a second level which is below said baseline ambient noise level by a predetermined amount, and continuously remains below said second level for a predetermined amount of time.

2. A method as recited in claim 1, wherein said baseline and current ambient noise levels are measured by computing an absolute value of a voltage or current on said telephone line.

3. A method as recited in claim 1, wherein a current or voltage signal on said telephone line is filtered to remove from said current or voltage signal at least frequency components below approximately 300 Hz before said current or voltage signal is employed to determine the baseline and current ambient noise levels on said telephone line.

4. A system for detecting the initiation, by a called party, of a three-way call, comprising:
   (a) means for determining a baseline ambient noise level on a telephone line connecting a calling phone to a central office;
   (b) means for monitoring a current ambient noise level on said telephone line, and generating a signal (ON_HOLD) indicative of a three-way call when said current ambient noise level falls below a second level which is below said baseline ambient noise level by a predetermined amount, and continuously remains below said second level for a predetermined amount of time.

5. A system as recited in claim 4, wherein said baseline and current ambient noise levels are measured by computing an absolute value of a voltage or current on said telephone line.

6. A system as recited in claim 4, comprising means for filtering a current or voltage signal on said telephone line to remove from said current or voltage signal at least frequency components below approximately 300 Hz before said current or voltage signal is employed to determine the baseline and current ambient noise levels on said telephone line.

7. A system as recited in claim 4, wherein said baseline and current ambient noise levels are measured by computing an absolute value of a voltage or current on said telephone line; and further comprising means for filtering a current or voltage signal on said telephone line to remove from said current or voltage signal at least frequency components below approximately 300 Hz before said current or voltage signal is employed to determine the baseline and current ambient noise levels on said telephone line.

* * * * *

UNITED STATES PATENT AND TRADEMARK OFFICE
CERTIFICATE OF CORRECTION

PATENT NO. : 5,768,355
DATED : June 16, 1998
INVENTOR(S) : Salibrici et al.

It is certified that error appears in the above-identified patent and that said Letters Patent is hereby corrected as shown below:

Column 4, line 46, please delete "$C_1 32$" and insert therefor --$C_1=$--.

Signed and Sealed this

Twelfth Day of October, 1999

Attest:

Q. TODD DICKINSON

*Attesting Officer*       *Acting Commissioner of Patents and Trademarks*